United States Patent
Alvarez et al.

(10) Patent No.: US 7,519,725 B2
(45) Date of Patent: Apr. 14, 2009

(54) SYSTEM AND METHOD FOR UTILIZING INFORMED THROTTLING TO GUARANTEE QUALITY OF SERVICE TO I/O STREAMS

(75) Inventors: Guillermo Alejandro Alvarez, San Jose, CA (US); David Darden Chambliss, Morgan Hill, CA (US); Divyesh Jadav, San Jose, CA (US); Tzongyu Paul Lee, Campbell, CA (US); Ramachandran Gopalakrishna Menon, Sunnyvale, CA (US); Prashant Pandey, Fremont, CA (US); Jian Xu, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 918 days.

(21) Appl. No.: 10/444,712

(22) Filed: May 23, 2003

(65) Prior Publication Data

US 2004/0236846 A1    Nov. 25, 2004

(51) Int. Cl.
*G06F 15/16* (2006.01)
*G01R 31/08* (2006.01)

(52) U.S. Cl. .................. 709/232; 709/234; 370/229; 370/230.1

(58) Field of Classification Search .......... 709/224, 709/232–234; 370/443, 468, 230.1, 231, 370/229, 235
See application file for complete search history.

(56) References Cited

U.S. PATENT DOCUMENTS 5,473,773 A    12/1995    Aman et al. ............. 395/650

(Continued)

FOREIGN PATENT DOCUMENTS

EP    1229685 A2    8/2002

(Continued)

OTHER PUBLICATIONS

Chenyang Lu, et al. "Aqueduct: online data migration with performance guarantees," Conference on file and Storage Technologies (FAST'02), pp. 219-230, Jan. 28-30, 2002, Monterey, CA (Usenix, Berkeley, CA.).

(Continued)

*Primary Examiner*—Moustafa M Meky
*Assistant Examiner*—Philip J Chea
(74) *Attorney, Agent, or Firm*—Cantor Colburn LLP; Van Nguy (57) ABSTRACT

The present system and associated method resolve the problem of providing statistical performance guarantees for applications generating streams of read/write accesses (I/Os) on a shared, potentially distributed storage system of finite resources, by initiating throttling whenever an I/O stream is receiving insufficient resources. The severity of throttling is determined in a dynamic, adaptive way at the storage subsystem level. Global, real-time knowledge about I/O streams is used to apply controls to guarantee quality of service to all I/O streams, providing dynamic control rather than reservation of bandwidth or other resources when an I/O stream is created that will always be applied to that I/O stream. The present system throttles at control points to distribute resources that are not co-located with the control point. A competition model is used with service time estimators in addition to estimated workload characteristics to determine which I/O needs to be throttled and the level of throttling required. A decision point issues throttling commands to enforcement points and selects which streams, and to what extent, need to be throttled.

32 Claims, 5 Drawing Sheets

U.S. PATENT DOCUMENTS

| | | | |
|---|---|---|---|
| 5,537,542 A | 7/1996 | Eilert et al. | 395/184.01 |
| 5,675,739 A | 10/1997 | Eilert et al. | 395/200.11 |
| 5,799,002 A | 8/1998 | Krishnan | 370/234 |
| 6,119,235 A * | 9/2000 | Vaid et al. | 726/11 |
| 6,222,856 B1 | 4/2001 | Krishnan et al. | 370/468 |
| 6,286,052 B1 | 9/2001 | McCloghrie et al. | 709/238 |
| 6,324,184 B1 * | 11/2001 | Hou et al. | 370/468 |
| 6,393,455 B1 | 5/2002 | Eilert et al. | 709/105 |
| 6,434,164 B1 * | 8/2002 | Matsunaga et al. | 370/443 |
| 6,434,624 B1 | 8/2002 | Gai et al. | 709/232 |
| 2001/0025310 A1 | 9/2001 | Krishnamurthy et al. | 709/223 |
| 2002/0049608 A1 | 4/2002 | Hartsell et al. | 705/1 |
| 2002/0049841 A1 | 4/2002 | Johnson et al. | 709/225 |
| 2002/0091722 A1 | 7/2002 | Gupta et al. | 707/204 |
| 2002/0107908 A1 | 8/2002 | Dharanikota | 709/203 |
| 2002/0152305 A1 | 10/2002 | Jackson et al. | 709/224 |
| 2003/0212787 A1 * | 11/2003 | Qiu et al. | 709/224 |
| 2004/0010585 A1 * | 1/2004 | Jones et al. | 709/224 |

FOREIGN PATENT DOCUMENTS

| | | | |
|---|---|---|---|
| JP | 2002215408 A | 8/2002 | |
| WO | WO0028706 A1 | 5/2000 | |

OTHER PUBLICATIONS

Prashant Pandey, et al. "Framework for algorithms/heuristics to achieve performance isolation using throttling in SledRunner," Dec. 10, 2002.

Ramesh Nagarajan, "Threshold-Based Congestion Control for the SS7 Signaling Network in the GSM Digital Cellular Network," IEEE Transactions on Vehicular Technology, vol. 48, No. 2, Mar. 1999.

Bjorn Frogner et al., "Monitoring and Prediction of Network Performance," IEEE 1999.

"Method to throttle resource communication via artificial CPU consumption," 1532/ Research Disclosure—Sep. 2001.

Hugo Patterson, et al. "A Status Report on Research in Transparent Informed Prefetching," Technical Report CMU-CS-93-113, Feb. 1993.

Kyung Ryu, et al. "Efficient Network and I/O throttling for Fine-Grain Cycle Stealing," Nov. 2001.

Suntae Hwang, "Control of parallel task granularity by throttling decomposition," IEEE 1997.

* cited by examiner

SYSTEM AND METHOD FOR UTILIZING INFORMED THROTTLING TO GUARANTEE QUALITY OF SERVICE TO I/O STREAMS

CROSS-REFERENCE TO RELATED APPLICATION

The present application is related to U.S. patent application, Ser. No. 10/187,227, filed on Jun. 28, 2002, titled "A Method for Improving Performance In A Computer Storage System By Regulating Resource Requests From Clients," assigned to the same assignee as the present application, and incorporated herein by reference in its entirety.

FIELD OF THE INVENTION

The present invention relates in general to computer storage systems, and more particularly to a storage system and associated method for controlling the processing of requests for resources, in order to improve the system performance.

BACKGROUND OF THE INVENTION

Computer storage systems shared among multiple applications should balance conflicting demands for allocating resources such as disk arms, array controllers, and the storage area network. This problem is compounded when applications from multiple clients share the same system, as in the case of a Storage Services Provider (SSP). Each client wants predictable performance, capacity, and reliability for his applications regardless of other users and of which loads they are imposing on the system.

In an exemplary model, customers establish Service Level Agreements (SLAs) with SSPs. SLAs prescribe the quality of service for each stream, i.e., for each set of accesses whose performance should be guaranteed and isolated from the behaviors of other streams. A typical SLA specifies maximum bounds on the amount of load the client is expected to impose on the system, and minimum guarantees on the level of service that the client must receive. An exemplary way of quantifying load is bandwidth, the number of accesses per time unit that each client may request from the storage system. An exemplary way of quantifying level of service is latency (or, equivalently, service time). The latency of a given access refers to the time elapsed from when the client initiates the access, until the moment when the client learns that the access has completed. A read access is completed by receiving the requested data. A write access is completed by receiving a notification of completion. Given that storage system resources are finite, a client may consume too many resources and "starve" other clients, i.e., prevent other clients from having storage system resource access for which they have contracted. Due to the high variability of realistic storage workloads and to technological limitations (in particular, the large variations on service times at storage devices and their strongly nonlinear behavior), guarantees are usually statistical; they describe the system's average responses over a period of time (e.g., several hours.)

Most importantly, nothing prevents one application from consuming more than its share of resources, even in an over-provisioned system. Consequently, different customers may in general not be performance-isolated from one another. Some mechanisms may be utilized to alleviate this problem. For example, some streams may be throttled, i.e., their accesses may be artificially delayed in the storage system instead of being considered for service as soon as they are issued by the client. By throttling a set of carefully-chosen streams, the load on shared resources may go down, and the performance experienced by some non-throttled streams may in general improve.

Several existing approaches address similar versions of this problem, in both the storage and networking domains. An extreme approach is separate allocation, where each client receives its own set of hosts and storage devices, physically unrelated to the ones allocated to other clients. This approach is wasteful because spare resources may be available in one part of the system while other parts starve. In addition, the separate allocation approach (shared-nothing system) is difficult and expensive to implement in practice because it requires totally disjoint storage area networks. The separate allocation approach leads to space allocation problems as well; hardware belonging to a given client may have to be physically contiguous, making future system growth very difficult.

An intermediate and widely followed approach is over-provisioning, where clients may share hardware, but the total amount of resources in the system is several times higher than the expected requirements of the workloads. Three-fold margins of error in system design are not unseen; big corporations that can afford to hire experienced administrators can reduce this to a factor or two by careful planning and monitoring. The economic disadvantage should be obvious for systems costing in the order of tens of millions of dollars. Over-provisioning still requires extensive monitoring to detect when resources are almost exhausted and consequently take appropriate action; humans are the highest expense for high-end storage systems. The over-provisioning approach is only well suited for coarse, infrequent allocation or reallocation decisions; humans cannot react to sudden spikes in the workload.

Even if humans attempt to respond to sudden spikes in the workload, they may not always make the right choices in the first try. Over-provisioning does little to solve the lack of performance isolation in a shared system; the problem may be ameliorated as less sharing is taking place, but there still is no limit to the amount of interference one client can cause to others.

Several solutions have been proposed. However, in some of these solutions workloads may be unnecessarily throttled even in an underutilized system. Even if throttling were somehow known to be warranted, the proposed solutions do not describe how to identify streams that should be throttled so that other streams begin to experience improved performance.

Other solutions deal with managing the CPU resource. They rely on their ability to model the reactions of the resource to reallocation decisions by using a simple linear model of CPU cycles. These techniques do not solve the problem of balancing conflicting demands for allocating resources, as the storage subsystem is harder to model and has much more variable behavior than the CPU. Also, this solution relies on resources that allow sampling for measurements of their performance during the recent past; this is not always a viable option.

One method provides guaranteed performance by varying the amount of cache allocated to each application. This approach assumes direct control over the shared resource (the cache), and controls the allocation of that resource only at the control point. In this approach, the control point can be totally separated from the resources being arbitrated. However, this approach relies on accurate measurements of the shared resources being available.

In yet another approach to balancing conflicting demands for allocating resources a single stream may get throttled, the migration stream. This approach does not need to identify candidates for throttling. In addition, this approach must has perfect knowledge of, and total control over, the application generating the throttled stream.

Some proposed solutions describe a method for apportioning network bandwidth among different servers running on the same host. Again, the network is much easier to model and monitor than the storage subsystem. However, those solutions do not monitor how well the system is doing, providing no feedback. In addition, they require detailed descriptions from human administrators about when throttling is supposed to start, and how severe it should be. The trigger for throttling is a static value set by system administrators, with no dynamically adaptive capability.

Other proposed solutions in the networking domain perform throttling at the computer nodes originating the load. This scheme has no feedback, as each node shapes locally originated traffic following policies stored from a central repository, regardless of the status of the other nodes and of the amount of resources available in the system at each point in time. In this approach, the system has no centralized control. No attempt is made to detect and react to scenarios of over- or under-provisioning.

Integrated services and differentiated services (IntServ, DiffServ) are two industry standards for networking. They allow for queuing/delaying some network packets according to the SLAs for their source clients. In IntServ, the first packet in a stream makes resource reservations along its way through the network; if the network is over-committed, packets may be dropped or delayed. In DiffServ, edge nodes assign priorities from a small set to each incoming packet, and routers within the network follow the priorities to make dropping/queuing decisions. Dropping packets is not a viable option for storage access protocols (e.g., SCSI) as they tolerate it very poorly. The point of control is always co-located with the resource being controlled.

What is needed is a system and associated method which, assuming that the storage system has sufficient resources to satisfy all its client demands, ensure that those clients receive service that meets their SLAs. The system and method should initiate throttling whenever some stream is receiving insufficient resources and determine the severity of throttling in a dynamic, adaptive way, independent of accurate measurements of shared resources or sampling for measurements of performance. The need for such a system and associated method has heretofore remained unsatisfied.

SUMMARY OF THE INVENTION

The present invention satisfies this need, and presents a system, a computer program product, and associated method (collectively referred to herein as "the system" or "the present system") for utilizing informed throttling to guarantee quality of service to I/O streams. The present system solves the problem of enforcing performance SLAs for applications generating streams of read/write accesses (I/Os) on a shared, potentially distributed storage system of finite resources. The present system initiates throttling whenever some I/O stream is receiving insufficient resources rather than blindly follow any (potentially wrong) trigger statically set by humans. In addition, the present system determines the severity of throttling in a dynamic, adaptive way. Determination of throttling needs is made at the storage subsystem level.

The present system combines all of the following characteristics to achieve its objective of informed throttling to guarantee quality of service to I/O streams. The present system uses global, real-time knowledge about I/O streams to apply controls to guarantee quality of service to all I/O streams. Prior solutions fail to integrate data monitored at different points in the system into a consistent view. The present system provides dynamic control rather than reservation of bandwidth or other resources when an I/O stream is created that may always be applied to that I/O stream. The present system throttles at control points to distribute resources that are not co-located with the control point. The present system introduces the concept of a decision point that issues throttling commands to enforcement points.

The only knowledge required about clients is their declarative commitments for long-term behavior; the present system addresses short- and medium-term variations without hints or any other kind of prior notification. Correct operation does not depend on any thresholds, or static fractions of the total resource allocation, supplied by system administrators. The present system allows administrators to specify declarative performance targets (as part of the SLAs) and to have the system automatically do whatever is necessary to achieve them. Targets need not be statically determined at any given point in the lifetime of the system (in particular, not at the initial configuration stage); they can be changed any number of times while the system is in operation servicing I/Os.

In addition, the present system introduces ways in which the decision point may select which streams, and to what extent, need to be throttled. These decisions are made by starting from incomplete information regarding the future and the performance consequences of the current load. Consequently, the embodiments of the present system are referred to as "heuristics". By being able to detect and respond to dynamic events in a very short time, the present system achieves levels of system utilization and responsiveness far better than those of traditional over-provisioning approaches. The fine-grain control made possible by the present system effectively pools all storage resources containing/leading to each piece of data, in such a way that all customers accessing that data may compete freely while being guaranteed statistical SLAs.

Different heuristics operate on different levels of information about the system's capabilities and current behavior. A priori, no specific knowledge is required about the amount of resources offered by networks and devices in the storage subsystem. No assumptions are made regarding the amount of remaining available resources, or regarding the storage system's expected response to failures and additions of capacity, workload variations, and throttling decisions.

However, if additional information is available, heuristics can make better decisions. Therefore, the present system can use refinements of the basic, relatively uninformed heuristics to make more accurate I/O throttling decisions. These throttling decisions are based on different types of additional information provided to the present system as input or inferred from the storage system while it is running. The basic heuristics in the present invention can be enhanced by a richer competition model, to capture the fact that different streams share (or, equivalently, compete for) common resources in the system to different degrees. The present system may also use estimated workload characteristics (e.g., to predict which workload may be better able to tolerate degradations in QoS) and/or prioritized client workloads and/or service time estimators (e.g., to predict the impact of changes in the workload presented to the storage devices) to make throttling decisions.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

Child: From graph theory, a node pointed to by a path from a parent.

Forest: A collection of trees that can be treated as one unit.

Heuristics: a method of solving problems by intelligent trial and error.

Leaf: Terminal node of a tree; a node with no child.

Node: A point or vertex in a graph.

Root: A node with no parent but typically with children.

Tree: A hierarchical structure or graph that is made up by nodes. Nodes are connected by edges from one node (parent) to another (child). A single node at apex of the tree is known as the root node, while the terminus of a path in the opposite direction is a leaf.

Figure 1:
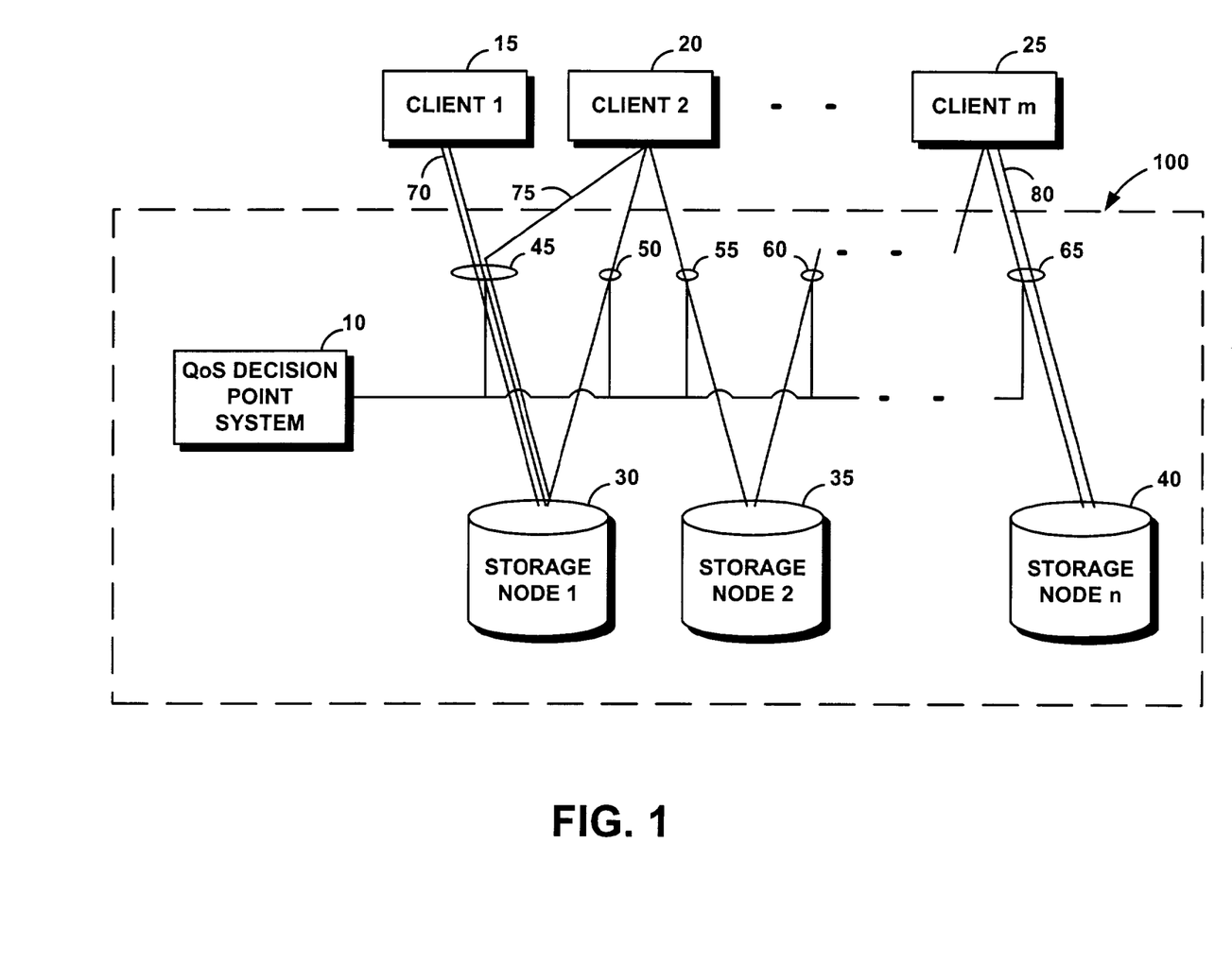
FIG. 1 is a schematic illustration of an exemplary operating environment in which an informed throttling system to guarantee quality of service to I/O streams of the present invention can be used.

FIG. 1 illustrates an exemplary high-level architecture of a storage system 100 comprising a centralized quality of service (QoS) decision point system 10. The QoS decision point system 10 includes a software programming code or computer program product that is typically embedded within, or installed on a computer. Alternatively, QoS decision point system 10 can be saved on a suitable storage medium such as a diskette, a CD, a hard drive, or like devices.

Clients such as client 1, 15, client 2, 20, up to and including client m, 25 access storage system 100. Clients may be general-purpose computers (equivalently, hosts) connected to the network, and running applications that access data stored in the storage system 100. The storage system 100 also comprises back end storage nodes such as storage node 1, 30, storage node 2, 35, up to and including storage node n, 40. Client 1, 15, client 2, 20, and client m, 25 are alternately referenced by the more general term clients 15, 20, 25. Likewise, storage node 1, 30, storage node 2, 35, and storage node n, 40 are alternately referenced by the more general term storage nodes 30, 35, 40.

The storage system 100 provides access for clients 15, 20, 25 to storage nodes 30, 35, 40. Without control, the clients 15, 20, 25 have unlimited access to storage nodes 30, 35, 40, in addition to uncontrolled competition for the resources of storage system 100, leading to unrestrained consumption of those resources.

Every I/O generated by client 1, 15, client 2, 20, client m, 25 can be intercepted by at least one (potentially dedicated) computer system on its way to the back-end storage nodes 30, 35, 40. This computer system is a QoS enforcement point, shown as QoS enforcement points 45, 50, 55, 60, and 65. The QoS decision point system 10 is a host that controls the operation of the QoS enforcement points 45, 50, 55, 60, 65, giving them instructions.

A few of the many possible streams in the system 100 are shown as streams 70, 75, 80. This invention QoS decision point system 10 depends on the capability of the QoS enforcement points 45, 50, 55, 60, 65 to determine which stream 70, 75, 80 each incoming I/O belongs to, as that in turn determines whether the I/O should be throttled or not. There are many possible solutions to this problem; some depend on tagging each I/O at the client with an identifier for the stream 70, 75, 80 to which it belongs to. In this embodiment, QoS decision point system 10 makes this determination based on the triple comprised by the identifiers of the originating client, the QoS enforcement point the stream passes through, and the storage node it finally accesses. (This information is readily available from current access protocols such as SCSI.) Thus, streams 70 and 75 are distinguishable even though they access the same back-end storage node 1.

A feature of the QoS decision point system 10 is that every stream 70, 75, 80 between clients 15, 20, 25 and storage nodes 30, 35, 40 passes through one of the QoS enforcement points 45, 50, 55, 60, 65. Consequently, the QoS decision point system 10 has total knowledge of the I/O traffic and the response time of the storage system 100.

A feature of the QoS decision point system 10 ensures that each stream 70, 75, 80 receives a guaranteed level of resources. Periodically and/or as a response to asynchronous events, the QoS decision point system 10 gathers information from all enforcement points on the performance each stream 70, 75, 80 is currently receiving from the storage subsystem. Consequently, storage system 100 performance is continually monitored by the QoS decision point system 10.

The QoS decision point system 10 also knows the quality of service each stream 70, 75, 80 has requested through its SLA. The QoS decision point system 10 compares current performance with the performance targets for each stream 70, 75, 80 specified by the corresponding SLAs. Some of the SLAs may be broken, i.e. the corresponding streams 70, 75, 80 may not be receiving the quality of service specified in their SLAs. Conversely, some streams 70, 75, 80 may be receiving a higher quality of service than they are entitled through their SLA. If needed, the QoS decision point system 10 generates throttling commands so that some or all of the enforcement points will start delaying some or all of the I/O streams 70, 75, 80 that flow through them while allowing I/Os from other streams 70, 75, 80 to flow unfettered. This throttling action may bring the quality of service provided to each stream 70, 75, 80 in agreement with their respective SLA.

The QoS decision point system 10 relies upon the server core, a framework to implement algorithms/heuristics that achieve performance isolation using throttling. The framework decomposes the task of determining throttling changes to achieve the performance goals of a storage system that guarantees SLAs. Each of these tasks can be carried out differently by different algorithms, and some sub-tasks might be reusable.

Figure 2:
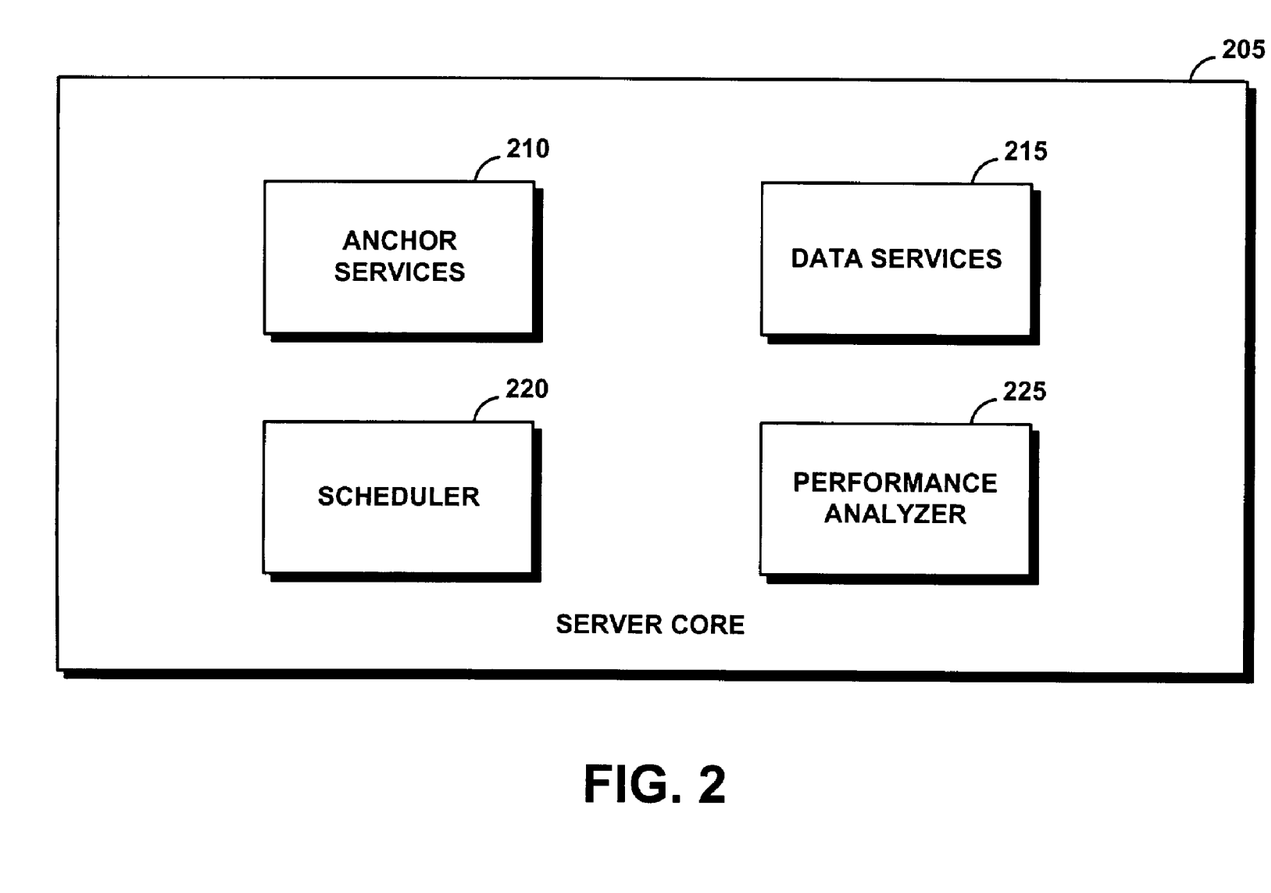
FIG. 2 is a block diagram of the high-level architecture of the server core of the informed throttling system of FIG. 1.

As shown in FIG. 2, an exemplary server core 205 comprises a sub-component AnchorServices 210, a sub-component DataServices 215, a sub-component Scheduler 220, and a sub-component PerformanceAnalyzer 225. The server core 205 is executed in the QoS decision point system 10 in FIG. 1.

In this embodiment, streams 70, 75, 80, whose performance is to be guaranteed, are grouped into QoS groups (for simplicity, every stream 70, 75, 80 is part of exactly one QoS group, even if the QoS group in question is a singleton). Each group corresponds to exactly one SLA. This invention guarantees that, as long as the combined demand of all streams 70, 75, 80 in the group does not exceed the bounds stated in the SLA, all of them are going to (statistically) receive the minimum QoS stated in the SLA. This grouping of streams 70, 75, 80 into groups induces a forest structure in the set of all streams, where each tree in the forest has the SLA as root, and the subset of all streams 70, 75, 80 sharing that SLA as children. (This is described without loss of generality; it can be readily extended by any person skilled in the art to supporting multiple levels in the hierarchy of streams, i.e., streams grouped into multiple nested groups that do or do not overlap.) The generic term entity is used to designate both QoS groups and streams in a system configuration.

The framework of the QoS decision point system 10 makes available the forest of the controlled system to other components running in the QoS decision point system 10, in particular the throttling heuristics. This dynamic forest structure is maintained by the sub-component AnchorServices 210 of the server core 205.

The framework of the QoS decision point system 10 allows the use of raw performance and summary reports for different abstractions of the system. The summary reports compare the current state of the QoS groups to their performance goals. These reports are maintained by the sub-component DataServices 215 of the server core 205. The data for the reports is periodically communicated to the QoS decision point by all QoS enforcement points, that measure stream performance during time intervals of the system's operation (sampling periods).

In the server core 205, the sub-component Scheduler 220 is responsible for activating the sub-component PerformanceAnalyzer 225 each time period, after polling of the gateways and roll-up of raw data have been completed. The PerformanceAnalyzer 225 in turn calls the AnalyzePerformance( ) method exposed by the framework of the QoS decision point system 10 every r time periods.

Each time that AnalyzePerformance( ) is called, a "tap" of DataServices 215 is available for each entity in the system; this tap can provide the aggregated performance and summary reports for the previous r sampling periods. A performance report comprises delivery metrics such as response time and demand metrics such as iops and mbps.

AnchorServices 210 also maintains dynamic attributes for each entity including the throttling parameters for each stream 70, 75, 80. After reaching decisions, the results are stored in dynamic entity attributes and the results are used to effect the required throttling changes at the QoS enforcement points.

Figure 3:
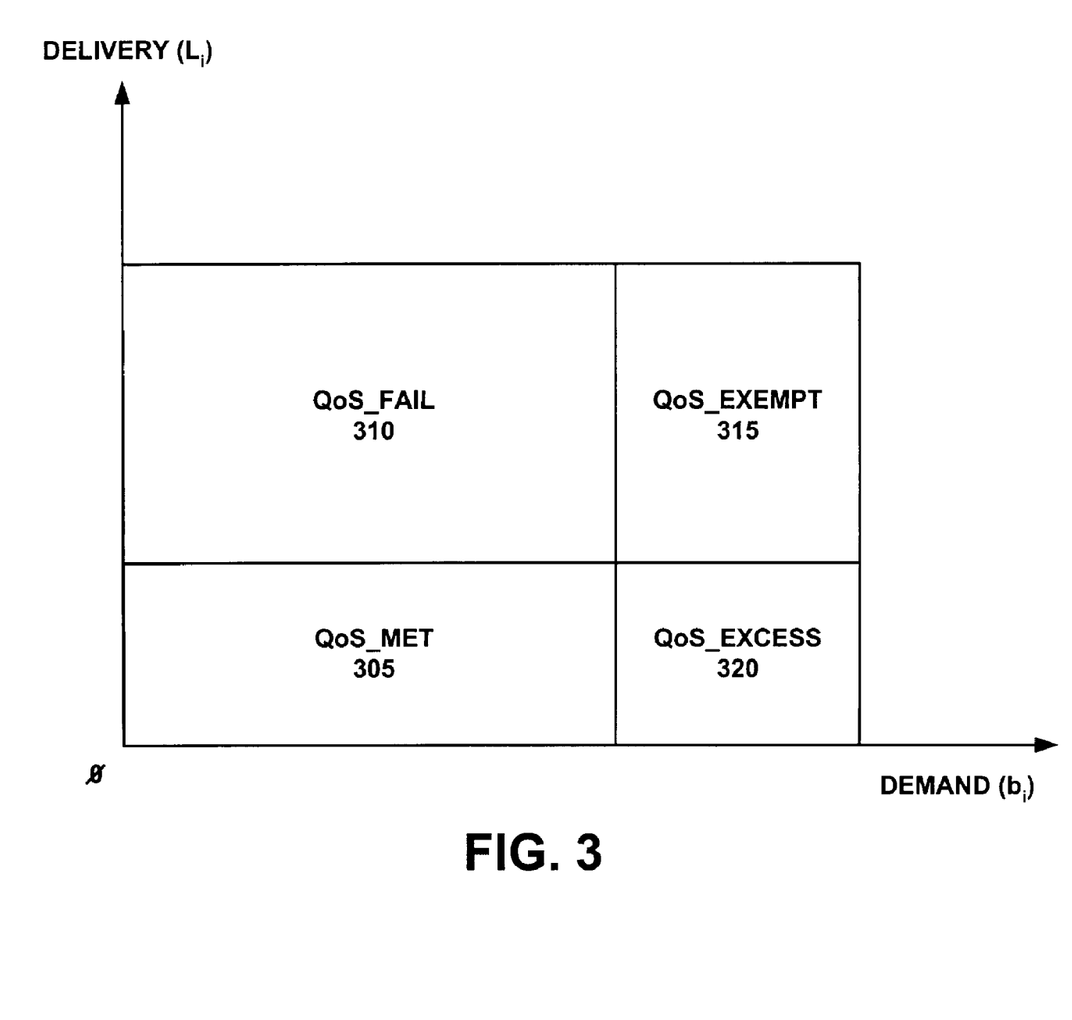
FIG. 3 is a diagram illustrating the possible categories of I/O stream performance addressed by the informed throttling system of FIG. 1.

The diagram of FIG. 3 shows that each individual I/O stream is classified by the QoS decision point system 10 into one of four heuristic-dependent categories, according to the values of the chosen demand and delivery metrics during the last sampling period: QoS_Met 305, QoS_Fail 310, QoS_Exempt 315, or QoS_Excess 320. Each of these categories is based on demand by each stream 70, 75, 80, and quality of the service delivered to that stream 70, 75, 80.

In the example shown in FIG. 3, demand by streams 70, 75, 80 is represented by $b_i$, or bytes per second of I/O access. Delivery metrics, or latency, are shown as $L_i$ in FIG. 3. As large system latencies are not desirable, the further from "0" on the $L_i$ axis of FIG. 3, the worse the storage system performs.

Streams 70, 75, 80 in the category QoS_Met 305 offer the promised load; they accordingly receive the promised QoS in terms of delivery. Streams 70, 75, 80 in the category QoS_Fail 310 offer the promised load but still receive substandard service. They are not generating a higher demand than allowed by the SLA yet the storage system is unable to meet that level of I/O access; immediate action is required. Streams 70, 75, 80 in the category QoS_Exempt 315 offer excessive load, and rightfully do not experience guaranteed performance because their I/O demands are greater than their SLA allowances. Streams 70, 75, 80 in category QoS_Excess 320 offer excessive load yet still receive guaranteed performance. This category should be allowed to exist only when no other stream is lacking resources. However, if performance of other streams is suffering, streams in categories QoS_Exempt 315 or QoS_Excess 320 may be throttled to free resources for streams in category QoS_Fail 310.

At the end of each sampling period, the QoS decision point system 10 classifies the state of each stream 70, 75, 80 based on performance statistics gathered by the hosts at QoS enforcement points 45, 50, 55, 60, 65. If no streams 70, 75, 80 are in the category QoS_Fail 310, the QoS decision point system 10 does not revise any previously-made decisions. Otherwise, the QoS decision point system 10 takes new action, throttling one or more I/O streams 70, 75, 80. In this embodiment, throttling decisions are made by considering all streams 70, 75, 80 equally important, solely as a function of what decisions are likely to result in the highest number of streams 70, 75, 80 being out of the QoS_Fail 310 state. In an alternative embodiment, the QoS decision point system 10 can throttle streams 70, 75, 80 as a function of their relative priorities, e.g., if the (real-world, e.g., financial) cost of failing to provide the guaranteed QoS is not uniform across streams 70, 75, 80.

Figure 4:
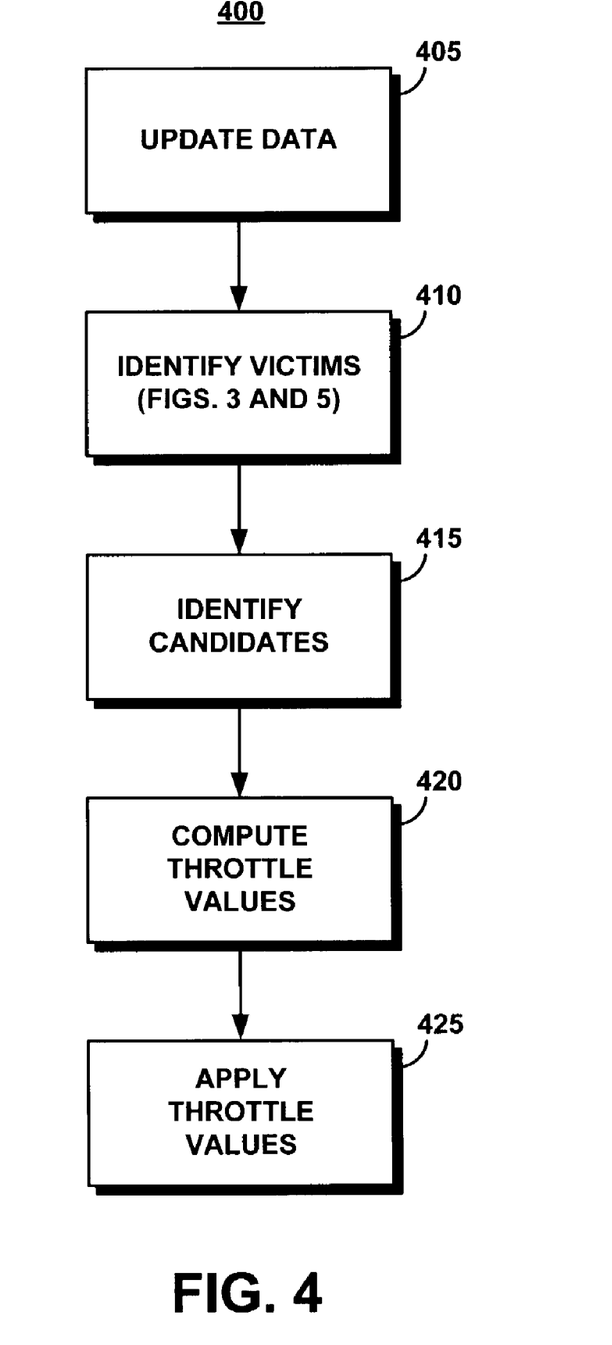
FIG. 4 is a process flow chart illustrating a method of operation of the informed throttling system of FIG. 1.

Each time the "informed throttling" component in the QoS decision point system 10 is activated, it performs a sequence of steps or method 400 as described in the process flow chart of FIG. 4. Method 400 is a generic heuristics. Before the invocation of method 400, initialization has been performed. Initialization comprises allocating memory for storing the data structures required by the QoS decision point system 10 and initializing all the fields of the data structures.

Before any QoS analysis can occur, the QoS decision point system 10 updates the fields of all the data structures being maintained based on the most recent measurements obtained from DataServices 215. The hosts for the QoS enforcement points 45, 50, 55, 60, 65 gather all the information required by the QoS decision point system 10 to perform the heuristic. It may be the case that heuristics compute derived quantities. An internal representation is also used; the QoS decision point system 10 updates the internal representation to reflect the latest statistics. This update, step 405, is the UpdateData( ) method.

The sub-component DataServices 215 computes a summary status for each QoS group. This summary status indicates how the load put on the system by the QoS group, and the delivery to the QoS group compared to the contract. The exemplary heuristic computes and stores the following attributes for each entity:

deliverySummary: observed average service time/agreed-upon maximum service time.

loadsummary: observed number of I/Os per second/agreed-upon maximum number of I/Os per second.

compoundSummary: a composite metric, derived from the extent to which the QOS group is satisfying the agreed-upon bounds on offered load, and from the level of service its I/Os are getting.

state: the classification for the entity as in FIG. 3.

Data structures used by UpdateData( ) are systemState and maintainedData. The systemState data structure comprises the structure of the QoS group forest, including values for dynamic attributes made available by AnchorServices 210 in addition to current raw and summary reports provided by DataServices 215. The data structure miantainedData are a subset of the metrics available in each performance report; the QoS decision point system 10 makes decisions based on these values. In addition to the data made available by DataServices 215 and AnchorServices 210, the QoS decision point system 10 can choose to maintain any historical or trend data required to make decisions. Examples of data structures that may be maintained are:

1. Decaying average. For each metric, the following is performed:

$$x=(\alpha)x+(1-\alpha)v$$

where x is the decaying average for the metric, v is the latest measured value of the metric, and a is the decaying factor. This calculation is meaningful only for additive metrics.

2. Peak-following average. The following computation is performed for each metric:

if (v>y) then y=v, else: $y=(\beta)y+(1-\beta)v$;

end if where y is the peak-following average, v is the latest measured value of the metric and β is the decaying factor. Again, this calculation is meaningful only for additive metrics.

3. Peaks. Last p peak values with time stamps (separately for each metric).

4. Exact measurements for the previous q aggregated intervals of length r×s where r is the length of a sampling period, and s and q are integers.

The QoS decision point system 10 determines which streams are suffering (i.e., in the QoSFailed state), also referred to as victims. The QoS decision point system 10 invokes the FindVictims( ) method at step 410. The FindVictims( ) method takes the systemstate and maintainedData and returns a list of streams that are in some way not meeting their performance requirements.

Figure 5:
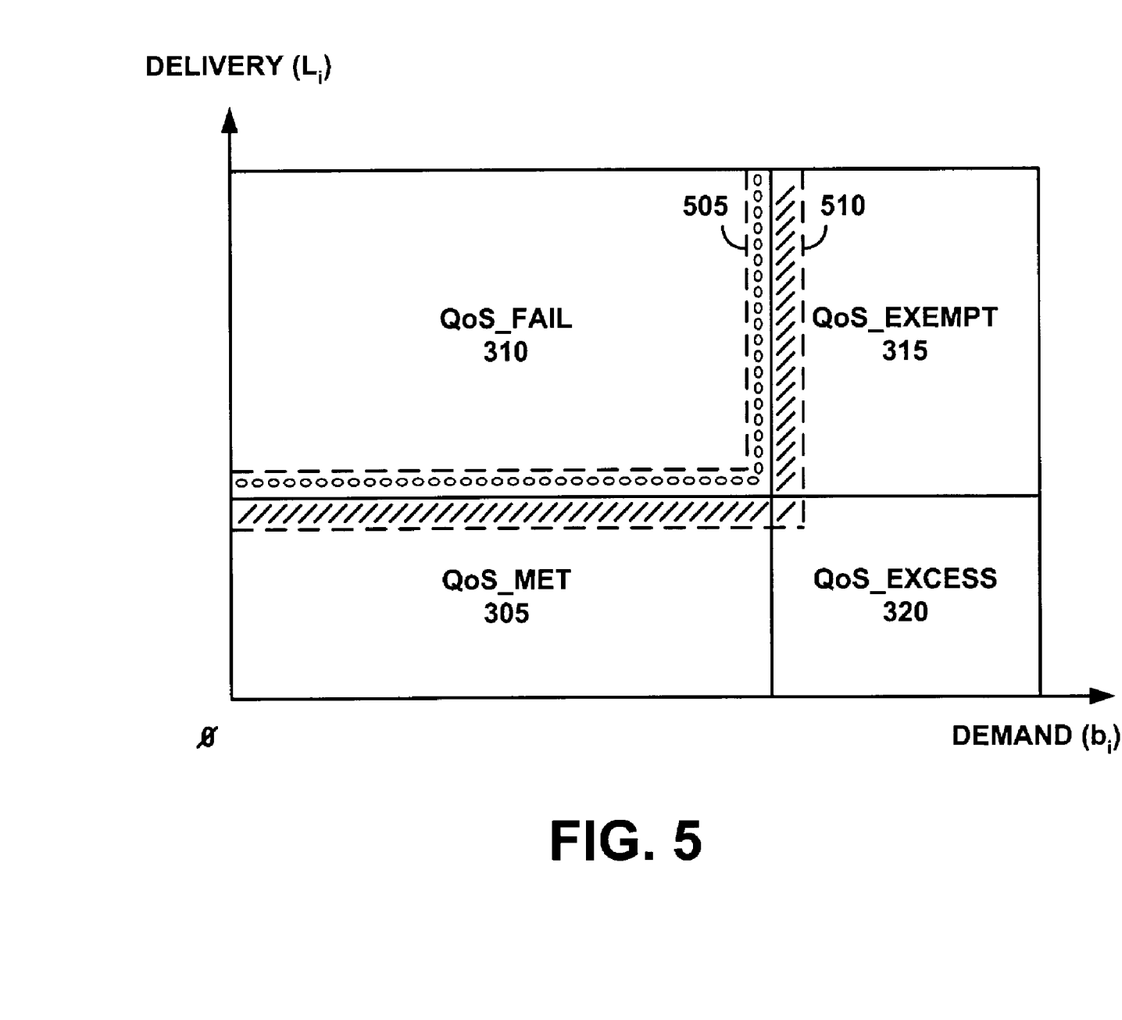
FIG. 5 is a diagram illustrating the flexibility applied by the informed throttling system of FIG. 1 to the possible categories of I/O stream performance.

Different algorithms or heuristics might determine a different list of victims given the same systemState; e.g., decisions on borderline cases may vary depending on the heuristic being used, past history, etc. The QoS decision point system 10 may wish to treat the boundaries of the four categories of FIG. 3 dynamically, as shown in FIG. 5. If the QoS decision point system 10 selects boundary 505, fewer victims suffering degraded performance may be found because the range of acceptable performance (category QoS_Met 305) is greater. If the QoS decision point system 10 selects boundary 510, more victims suffering degraded performance may be found because the range of acceptable performance (category QoS_Met 305) is smaller.

The algorithm for the method FindVictims( ) is as follows:

```
systemStatus = 0.0
victimsList = { } //empty
for all qosg in the forest do
    qosg.compoundSummary = η(qosg.loadSummary − 1.0) + κ(1.0 −
        qosg.deliverySummary)
    where η and κ are positive constants.
    if (qosg.deliverySummary > 1.0) and (qosg.loadSummary ≦ 1.0) then
        // danger - node offering bounded load but getting inferior QoS
        qosg.state = QOS_FAILED
        systemStatus = systemStatus + qosg.compoundSummary
        append qosg to victimsList
    else if (qosg.deliverySummary ≦ 1.0) and (qosg.loadSummary ≦ 1.0)
    then
        //ok - node offering bounded load, getting performance guarantees
        qosg.state = QOS_MET
    else if (qosg.deliverySummary > 1.0) and (qosg.loadSummary > 1.0)
    then
        //out of scope - node offering too much load, and not getting
        //guaranteed performance
        qosg.state = QOS_EXEMPT
    else if (qosg.deliverySummary ≦ 1.0) and (qosg.loadSummary ? 1.0)
    then
        //node receiving guaranteed performance even though it does
        //not fulfill its part of the deal
        qosg.state = QOS_EXCESS
    end if
end for
return victimsList
```

If the system status is 0 then no action is required since all SLAs are being met. In that case, the heuristic stops at the end of step 410 without taking any proactive steps to stop future failures. Otherwise, the systemStatus variable holds a measure of how problematic the current system situation actually is.

As a function of victims and system state, the QoS decision point system 10 determines which streams 70, 75, 80 to throttle. The QoS decision point system 10 invokes the FindCandidates( ) method at step 415. The FindCandidates( ) method takes the systemState, maintainedData, and victim- List generated by the FindVictims( ) method (step 410). The FindCandidates( ) method generates a list of streams 70, 75, 80 that are candidates for throttling. This heuristic assumes that changing the throttling limits of streams 70, 75, 80 in the list might help the storage system by bringing the storage system closer to its overall performance goals. In this exemplary embodiment, the QoS decision point system 10 can throttle streams in category QoS_Excess 320 first, then streams in category QoS_Exempt 315, and then streams in category QoS_Met 305, as required.

The algorithm for FindCandidates( ) is as follows:

```
num_throttled = 0
throttled Nodes = { } //empty
i = 0
for all qosg for which (qosg.state = QOS_EXCESS) or (qosg.state = QOS_EXEMPT)
    in descending order of qosg.compoundSummary do
        for all str in qosg do
            if str hasn't been throttled in past SKIP_CYCLES invocations then
                increment num_throttled
                append str to throttledNodes
            end if
            if (num_throttled ≧ MAX_THROTTLED_PER_CYCLE) then
                return throttledNodes
            end if
        end for
end for
for all qosg for which (qosg.state = QOS_MET) in descending order of
qosg.compoundSummary do
    repeat processing performed in previous case
end for
```

The embodiment of FindCandidates( ) implemented by the pseudo code tries the different stream categories of streams 70, 75, 80 in FIG. 3 in a predefined order to find candidates for throttling in the absence of more detailed information.

In general, a competition model is used by the present QoS decision point system 10 to determine which I/O stream 70, 75, 80 needs to be throttled and the level of throttling required. The competition model captures the fact that different streams 70, 75, 80 may share (or, equivalently, compete for) common resources in the system to different degrees. The competition model implemented by the pseudocode shown for FindCandidates( ) assumes that every stream 70, 75, 80 competes with every other stream 70, 75, 80 to the same degree.

An alternative embodiment is made possible by using a richer competition model. The system could determine which entities are competing for disks, busses, switches, controllers, etc. by using input from the storage system configuration and human operators. This additional information can lead to better decisions regarding the most appropriate I/O streams 70, 75, 80 to throttle to provide the best overall performance. If human operators do not supply the required information for this refinement, the QoS decision point system 10 can infer it based on monitored data; as an example, this could be achieved by mining the correlations between observed changes in the performance of different I/O streams. The QoS decision point system 10 could also gather the information required by this refinement by using automatic system discovery tools. After having acquired this information, the embodiment chooses candidates for throttling based on which particular stream 70, 75, 80 has been determined to be in the QoS_Failed state—giving preference to other streams 70, 75, 80 that are using too many resources and have a high degree of sharing with it. In the exemplary system 100 depicted in FIG. 1, if stream 70 is experiencing performance problems, throttling stream 80 would have no beneficial effect because the two streams 70, 80 do not share resources; stream 75 should be throttled instead.

Another alternative embodiment of the FindCandidates( ) method comprises using available information, e.g. service-time estimators, about the resources currently available in the storage system. Although the QoS decision point system 10 does not depend on detailed performance predictions and/or utilization measurements for shared resources, it can utilize them if they are available.

The base heuristics provides performance guarantees for I/O streams 70, 75, 80 without communication with, or performance samples from, the resources for which streams 70, 75, 80 compete. In other terms, it is location-independent. The QoS decision point system 10 provides performance guarantees for the I/O streams without requiring knowledge about expected system responses to throttling actions. For this refinement, the QoS decision point system 10 could use predictive models for devices that predict how the performance of those devices willmay be affected by a throttling decision under consideration. Using these models willmay address such issues as whether slowing down one I/O stream 70, 75, 80 may help another I/O stream 70, 75, 80 or whether throttling an I/O stream 70, 75, 80 may adversely affect overall throughput beyond acceptable bounds.

Yet another embodiment of heuristics provided by the QoS decision point system 10 is the use of workload characterization. Some workloads tolerate throttling better than others do. Using this refinement, the QoS decision point system 10 determines which I/O streams 70, 75, 80 are more elastic and how much a stream 70, 75, 80 can be throttled before doing serious harm. The information required for this refinement is either supplied by human operators or inferred by the QoS decision point system 10 by mining correlations. The QoS decision point system 10 can also instruct the QoS enforcement points 45, 50, 55, 60, and 65 to inject spurious I/Os not generated by any client node to analyze the storage system's response to the thus-modified I/O streams 70, 75, 80. The response of the storage system is then used as input for determining elasticity or for creating a competition map for the richer competition model.

In an alternative embodiment, the QoS decision point system 10 would provide prioritized performance to clients. That would allow the QoS decision point system 10 to address not only the case in which the storage system has enough resources to satisfy all clients, but also the under-provisioning case. Some clients may be willing to pay more for their statistical performance guarantees. This increased fee may take the form of higher service fees, increased penalties on the SSP for contract violations, etc. If such a client's I/O stream 70, 75, 80 has client-supplied priorities, the QoS decision point system 10 can take these priorities into account when determining which I/O needs to be throttled and the level of throttling required.

Throttling is not binary. The QoS decision point system 10 should also decide how much demand (e.g., I/Os, or megabytes) to allow through per time unit. The QoS decision point system 10 computes throttle values for each candidate in the throttle set. For example, the QoS decision point system 10 may determine that stream 75 may receive no more than 100 bytes/second while stream 70 may receive no more than 1000 bytes/second. At step 420, the QoS decision point system 10 invokes the ComputeThrottleValues( ) method. This method takes the systemState, maintainedData, and the candidateList generated by FindCandidates( ) as input and returns a list of actual throttle values that should be applied to the entities. ComputeThrottleValues( ) uses the averages and peaks being computed by this heuristic along with the current measured values, structural information about the forest, and the computed status of the whole system to decide a throttle value for the stream 70, 75, 80 in question. The ComputeThrottleValues( ) method might decrease the current demand limit for all streams in a QoS group by the same percentage, computed in turn as how much the current total demand placed by the whole QoS group exceeds its SLA limit, for example. Similarly, ComputeThrottleValues( ) could use averages, or peaks, or a function of all of these, over some number of past sampling periods. Conversely, the ComputeThrottleValues( ) method might use a percentage of the current measured value or average, etc., based on the fraction of the QoS group's load that this stream contributes and its current delivery status compared to the SLA of the QoS group.

The QoS decision point system 10 applies the throttling values at step 425. Throttling occurs in hosts for the QoS enforcement points 45, 50, 55, 60, 65. The QoS decision point system 10 communicates to the hosts for the QoS enforcement points 45, 50, 55, 60, 65 the throttle values; these hosts perform the throttling function on each specified I/O stream 70, 75, 80. Steps 405, 410, 415, and 420 all use heuristics, and as such admit many possible embodiments besides the ones presented in this document; step 425 effects the decisions made by the previous steps.

The previous exemplary heuristics compute throttling limits only at the level of individual streams 70, 75, 80. Alternative heuristics may follow similar decision-making procedures, but start by determining throttling limits for aggregate entities (e.g., whole QoS groups or other stream groups) at a higher level before moving on to the lower levels to decide how aggregated limits ultimately get translated into individual limits for each stream 70, 75, 80. Hierarchical heuristics of this sort have greater potential to minimize wasted work on large workloads with thousands of streams, by considering only the entities that are relevant to the particular kind of resource contention being experienced at any given time, and ignoring the others.

The embodiments described herein can be applied on their own or in arbitrary combinations to solve the problem addressed by the present invention. It is to be understood that the specific embodiments of the invention that have been described are merely illustrative of certain application of the principle of the present invention. Numerous modifications may be made to the system and method for utilizing informed throttling to guarantee quality of service to I/O streams invention described herein without departing from the spirit and scope of the present invention.

What is claimed is:

1. A processor-implemented method of utilizing informed throttling to guarantee quality of service to a plurality of clients, comprising:

for each client comparing a performance level received by the client to a corresponding contracted service level;

based on the compared performance level, determining if the client qualifies as a victim whose received performance level is less than the corresponding contracted service level, wherein determining if the client qualifies as a victim, further comprises:

classifying the client into one of plurality of heuristic-dependent categories, including a QoS_Met category indicative that the client's demand does not exceed the corresponding contracted service level, and that the client's demand is properly met, QoS_Fail category indicative that the client's demand does not exceed the corresponding contracted service level, and that the client's demand improperly not met, a QoS_Exempt category indicative that the client's demand exceeds the corresponding contracted service level, and that the client's is properly not met, and a QoS_Excess category indicative that the client's demand exceeds the corresponding contracted service level, and that the client's demand is properly met;

each of the heuristic-dependent categories dependent upon a demand by the client, a preexisting specification of a quality of service specified by the client, and a current performance experienced by the client; and computing, for each of a plurality of QoS groups having a common service level agreement (SLA): a delivery summary of an observed average service time divided by an agreed upon maximum service time; a load summary of an observed number of input/outputs (I/Os) per second, divided by an agreed upon maximum number of I/Os per second; and a compound summary comprising a composite metric reflective of an extent to which the QoS group is satisfying the agreed-upon bounds on offered load and from the level of service received by its I/Os:

based on the compared performance level, identifying one or more candidates for throttling in response to an I/O stream receiving insufficient resources by determining if the client qualifies as a candidate whose received performance level is better than the corresponding contracted service level; and selectively and dynamically issuing a throttling command to the candidate client; and providing a quality of service enforcement point by concurrently monitoring a plurality of I/O streams to candidate clients and by concurrently throttling commands to the candidate clients.

2. The method of claim 1, further comprising gathering and processing information regarding a quality of service provided to the clients.

3. The method of claim 1, grouping, in a throttle set, a plurality of candidate clients.

4. The method of claim 3, further comprising computing a throttle value that corresponds to each candidate client in the throttle set.

5. The method of claim 4, further comprising applying the throttle value to each corresponding candidate client in the throttle set.

6. The method of claim 1, wherein the demand by the client is represented by any one or more of: bytes per second of I/O access, and I/O's per second.

7. The method of claim 1, wherein:
the $QoS_{13}$ Failed category is determined whenever the delivery summary is >1 and the load summary is $\leq 1$;
the QoS_Met category is determined whenever the delivery summary is $\leq 1$ and the load summary is $\leq 1$;
the QoS_Exempt category is determined whenever the delivery summary is >1 and the load summary is >1; and
the QoS_Excess category is determined whenever the delivery summary is $\leq 1$ and the load summary is >1.

8. The method of claim 7, further comprising computing an overall system status reflective of the degree to which each of a plurality of SLAs are being met, the overall system status comprising a cumulative total of compound summaries for each QoS group, with a compound summary computed in accordance with the following expression:

compound summary=$\eta$(load summary−1)+$\kappa$(1−delivery summary);

and wherein $\eta$ and $\kappa$ are positive constants.

9. The method of claim 1, wherein selectively and dynamically issuing the throttling command to the candidate client comprises issuing the throttling command to the client that has been classified in the QoS_Exempt category, only if at least one victim client has been identified.

10. The method of claim 1, wherein classifying the client into one of a plurality of heuristic-dependent categories comprises classifying the client at the end of a sampling period.

11. The method of claim 10, wherein classifying the client at the end of the sampling period comprises classifying the client based on performance statistics gathered by the quality of service enforcement point during the sampling period.

12. The method of claim 11, wherein if no client exists in the QoS_Fail category, the quality of service enforcement point does not revise previously made decisions; and
if there exists a client in the QoS_Fail category, the quality of service enforcement point takes corrective action by selectively throttling one or more I/O streams.

13. The method of claim 1, further comprising making a determination to identify the clients that compete for resources; and
based on the determination, selectively throttling I/O streams to candidate clients.

14. The method of claim 13, wherein making the determination comprises using input from storage configuration and human operators.

15. The method of claim 13, wherein making the determination comprises inferences from monitored data.

16. The method of claim 13, wherein selectively throttling the I/O streams to the candidate clients comprises selecting the candidate clients from a QoS_Fail category.

17. The method of claim 1, wherein making the determination comprises using location-independent information.

18. The method of claim 17, further comprising using at least one predictive model to predict how a throttling determination affects candidate clients' performance.

19. The method of claim 1, further comprising classifying workloads in relation to tolerance for throttling elasticity.

20. The method of claim 19, wherein classifying workloads comprises using information supplied by human operators.

21. The method of claim 19, wherein classifying workloads comprises using information inferred by mining correlations.

22. The method of claim 19, further comprising injecting spurious I/Os to analyze a systemic response.

23. The method of claim 22, further comprising using the systemic response as input for determining throttling elasticity.

24. The method of claim 22, further comprising using the systemic response as input for creating a competition map.

25. The method of claim 1, further comprising defining service level agreements for the I/O streams.

26. The method of claim 25, further comprising grouping the I/O streams into QoS groups.

27. The method of claim 26, wherein each I/O stream is part of exactly one QoS group and corresponds to one service level agreement.

28. The method of claim 1, further comprising assigning relative priorities to clients.

29. The method of claim 28, wherein clients with higher relative priorities are guaranteed the level of service specified in their contracts before clients with lower relative priorities.

30. The method of claim 29, wherein clients with lower relative priorities are considered for throttling before clients with higher relative priorities.

31. The method of claim 30, further comprising selectively assigning a high priority to a client having a predetermined contract type.

32. The method of claim 30, further comprising selectively assigning a high priority to a client having a predetermined fee structure.

* * * * *